United States Patent
Ando et al.

(10) Patent No.: US 8,170,778 B2
(45) Date of Patent: May 1, 2012

(54) INTERNAL COMBUSTION ENGINE SYSTEM, CONTROL METHOD OF INTERNAL COMBUSTION ENGINE SYSTEM, AND VEHICLE

(75) Inventors: Daigo Ando, Nisshin (JP); Kazuhiro Ichimoto, Nisshin (JP); Shinji Yamanaka, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 641 days.

(21) Appl. No.: 12/444,764

(22) PCT Filed: Jul. 17, 2007

(86) PCT No.: PCT/JP2007/064114
§ 371 (c)(1),
(2), (4) Date: Apr. 8, 2009

(87) PCT Pub. No.: WO2008/062583
PCT Pub. Date: May 29, 2008

(65) Prior Publication Data
US 2010/0094526 A1   Apr. 15, 2010

(30) Foreign Application Priority Data
Nov. 20, 2006   (JP) ................. 2006-313271

(51) Int. Cl.
*G06F 19/00*   (2006.01)
*F02N 11/08*   (2006.01)
*F02D 17/04*   (2006.01)

(52) U.S. Cl. ............... 701/112; 123/179.4; 123/179.16; 123/198 DB; 123/491; 903/905

(58) Field of Classification Search ............. 123/179.3, 123/179.4, 179.15, 179.16, 198 D, 198 DB, 123/198 F, 481, 491; 701/101–104, 110, 701/112, 113; 180/65.28; 903/905
See application file for complete search history.

(56) References Cited

U.S. PATENT DOCUMENTS

| | | | |
|---|---|---|---|
| 5,469,827 A * | 11/1995 | Tomisawa | 123/491 |
| 6,382,184 B2 * | 5/2002 | Nakamura et al. | 123/464 |
| 6,986,331 B2 * | 1/2006 | Mizutani | 123/179.15 |
| 7,159,572 B2 * | 1/2007 | Mizutani | 123/491 |
| 7,273,027 B2 * | 9/2007 | Mizutani | 123/179.16 |
| 7,275,510 B2 * | 10/2007 | Mizutani | 123/179.4 |
| 2009/0271095 A1 * | 10/2009 | Kojima | 701/113 |

FOREIGN PATENT DOCUMENTS

| | | | |
|---|---|---|---|
| JP | 05296084 A | * | 11/1993 |
| JP | 07-247885 A | | 9/1995 |
| JP | 2000205010 A | * | 7/2000 |
| JP | 2002-266674 A | | 9/2002 |
| JP | 2005-048730 A | | 2/2005 |

(Continued)

*Primary Examiner* — Willis Wolfe, Jr.
(74) *Attorney, Agent, or Firm* — Kenyon & Kenyon LLP

(57) ABSTRACT

On incompletion of port learning, an auto stop-permitting water temperature is set to a temperature which is higher than a temperature set on completion of the port learning and is higher than a port injection temperature as an upper limit temperature that enables an engine to be driven in a port injection drive mode. This arrangement increases the opportunity of continuing the operation of the engine with fuel injection from a port fuel injection valve without an auto stop, thus increasing the opportunity of the port learning.

9 Claims, 4 Drawing Sheets

FOREIGN PATENT DOCUMENTS

| | | |
|---|---|---|
| JP | 2005-307891 A | 11/2005 |
| JP | 2005-325794 A | 11/2005 |
| JP | 2005-330939 A | 12/2005 |
| JP | 2006-046084 A | 2/2006 |
| JP | 2006-46103 A | 2/2006 |
| JP | 2006-266193 A | 10/2006 |

* cited by examiner

INTERNAL COMBUSTION ENGINE SYSTEM, CONTROL METHOD OF INTERNAL COMBUSTION ENGINE SYSTEM, AND VEHICLE

This is a 371 national phase application of PCT/JP2007/064114 filed 17 Jul. 2007, claiming priority to Japanese Patent Application No. JP 2006-313271 filed 20 Nov. 2006, the contents of which are incorporated herein by reference.

TECHNICAL FIELD

The present invention relates to an internal combustion engine system, a control method of the internal combustion engine system, and a vehicle.

BACKGROUND ART

A proposed structure of an internal combustion engine system includes an engine equipped with a port fuel injection valve arranged to inject a fuel into an intake port and with an in-cylinder fuel injection valve arranged to directly inject the fuel into each cylinder (see, for example, Patent Document 1). This proposed internal combustion engine system successively performs learning with regard to the air-fuel ratio of the engine with fuel injection from only one of the port fuel injection valve and the in-cylinder fuel injection valve and learning with regard to the air-fuel ratio with fuel injection from only the other of the port fuel injection valve and the in-cylinder fuel injection valve. This technique ensures the adequate learning with regard to the air-fuel ratios of both the port fuel injection valve and the in-cylinder fuel injection valve.

Patent Document 1: Japanese Patent Laid-Open No. 2005-330939

DISCLOSURE OF THE INVENTION

In this prior art internal combustion engine system, the learning with regard to the air-fuel ratio under fuel injection from the port fuel injection valve is naturally performed in the state of activating the fuel injection from the port fuel injection valve. In another proposed structure of the internal combustion engine system, the engine is automatically stopped upon satisfaction of preset auto stop conditions including a condition that the temperature of cooling water in the internal combustion engine is not lower than a preset auto stop-permitting water temperature. The automatically-stopped engine is automatically restarted upon satisfaction of preset auto restart conditions. In this proposed internal combustion engine system, the auto stop of the engine at the cooling water temperature of not lower than the auto stop-permitting water temperature interferes with the learning under fuel injection from the port fuel injection valve. Namely the opportunity of such learning is undesirably decreased.

In an internal combustion engine system including an internal combustion engine equipped with a port fuel injection valve arranged to inject a fuel into an intake port and with an in-cylinder fuel injection valve arranged to directly inject the fuel into each cylinder, a control method of such an internal combustion engine system, and a vehicle, there would thus be a demand for increasing the opportunity of learning under fuel injection from the port fuel injection valve.

The present invention accomplishes at least part of the demand mentioned above and the other relevant demands by the following configurations applied to the internal combustion engine system, the control method of the internal combustion engine system, and the vehicle.

According to one aspect, the present invention is directed to an internal combustion engine system including an internal combustion engine equipped with a port fuel injection valve arranged to inject a fuel into an intake port and with an in-cylinder fuel injection valve arranged to directly inject the fuel into each cylinder. The internal combustion engine system has: a learning execution module configured to perform learning under fuel injection from the port fuel injection valve in a specified operation state of the internal combustion engine; an auto stop-permitting water temperature setting module configured to, on completion of the learning, set a first temperature to an auto stop-permitting water temperature that allows an auto stop of the internal combustion engine, and on incompletion of the learning, set a second temperature that is higher than the first temperature to the auto stop-permitting water temperature; a cooling water temperature detection unit constructed to measure temperature of cooling water in the internal combustion engine; and an auto stop restart controller configured to automatically stop operation of the internal combustion engine upon satisfaction of preset auto stop conditions including a condition that the measured temperature of cooling water is not lower than the set auto stop-permitting water temperature and to automatically restart the operation of the internal combustion engine upon satisfaction of preset auto restart conditions in an auto stop state of the internal combustion engine.

In the internal combustion engine system according to this aspect of the invention, on completion of the learning under fuel injection from the port fuel injection valve performed in the specified operation state of the internal combustion engine, the first temperature is set to the auto stop-permitting water temperature that allows an auto stop of the internal combustion engine. On incompletion of the learning, on the other hand, the second temperature that is higher than the first temperature is set to the auto stop-permitting water temperature. The operation of the internal combustion engine is automatically stopped upon satisfaction of the preset auto stop conditions including the condition that the temperature of cooling water in the internal combustion engine is not lower than the auto stop-permitting water temperature. The operation of the internal combustion engine is automatically restarted upon satisfaction of the preset auto restart conditions in the auto stop state of the internal combustion engine. Setting the second temperature higher than the first temperature to the auto stop-permitting water temperature on incompletion of the learning under fuel injection from the port fuel injection valve desirably increases the opportunity of continuing the operation of the internal combustion engine without an auto stop, thus increasing the opportunity of the learning under fuel injection from the port fuel injection valve. The ' learning under fuel injection from the port fuel injection valve' includes learning under fuel injection from only the port fuel injection valve and learning under fuel injection from both the in-cylinder fuel injection valve and the port fuel injection valve.

In one preferable application of the internal combustion engine system according to the above aspect of the invention, the learning execution module performs the learning under fuel injection control of activating fuel injection from only the port fuel injection valve and inactivating fuel injection from the in-cylinder fuel injection valve. Setting the second temperature higher than the first temperature to the auto stop-permitting water temperature on incompletion of the learning under fuel injection control of activating fuel injection only from the port fuel injection valve desirably increases the opportunity of the learning under fuel injection control of activating fuel injection from only the port fuel injection valve.

In another preferable application of the internal combustion engine system according to the above aspect of the invention, the learning execution module performs learning with regard to an air-fuel ratio as the learning under fuel injection from the port fuel injection valve. This arrangement desirably increases the opportunity of the learning with regard to the air-fuel ratio.

In one preferable embodiment of the invention, the internal combustion engine system further has an engine controller configured to control the internal combustion engine to have fuel injection from only the port fuel injection valve with stop of fuel injection from the in-cylinder fuel injection valve at the measured temperature of cooling water that is not higher than a preset reference temperature. The auto stop-permitting water temperature setting module sets the second temperature to be higher than the preset reference temperature. The internal combustion engine is thus not automatically stopped under the fuel injection control of activating fuel injection from only the port fuel injection valve and inactivating fuel injection from the in-cylinder fuel injection valve. This arrangement desirably increases the opportunity of the learning under fuel injection control of activating fuel injection from only the port fuel injection valve.

According to another aspect, the present invention is directed to a vehicle comprising: an internal combustion engine equipped with a port fuel injection valve arranged to inject a fuel into an intake port and with an in-cylinder fuel injection valve arranged to directly inject the fuel into each cylinder; a rotation speed regulator connected with an output shaft of the internal combustion engine, connected with a driveshaft, which is linked to an axle of the vehicle, such as to allow rotation of the driveshaft independently of the output shaft, and configured to regulate a relative rotation speed of the output shaft to the driveshaft with input and output of electric power and input and output of driving force from and to the output shaft and the driveshaft; a motor designed to input and output power from and to the driveshaft; a learning execution module configured to perform learning under fuel injection from the port fuel injection valve in a specified operation state of the internal combustion engine; an auto stop-permitting water temperature setting module configured to, on completion of the learning, set a first temperature to an auto stop-permitting water temperature that allows an auto stop of the internal combustion engine, and on incompletion of the learning, set a second temperature that is higher than the first temperature to the auto stop-permitting water temperature; a cooling water temperature detection unit constructed to measure temperature of cooling water in the internal combustion engine; and an auto stop restart controller configured to automatically stop operation of the internal combustion engine upon satisfaction of preset auto stop conditions including a condition that the measured temperature of cooling water is not lower than the set auto stop-permitting water temperature and to automatically restart the operation of the internal combustion engine upon satisfaction of preset auto restart conditions in an auto stop state of the internal combustion engine.

In the vehicle according to this aspect of the invention, on completion of the learning under fuel injection from the port fuel injection valve performed in the specified operation state of the internal combustion engine, the first temperature is set to the auto stop-permitting water temperature that allows an auto stop of the internal combustion engine. On incompletion of the learning, on the other hand, the second temperature that is higher than the first temperature is set to the auto stop-permitting water temperature. The operation of the internal combustion engine is automatically stopped upon satisfaction of the preset auto stop conditions including the condition that the temperature of cooling water in the internal combustion engine is not lower than the auto stop-permitting water temperature. The operation of the internal combustion engine is automatically restarted upon satisfaction of the preset auto restart conditions in the auto stop state of the internal combustion engine. Setting the second temperature higher than the first temperature to the auto stop-permitting water temperature on incompletion of the learning under fuel injection from the port fuel injection valve desirably increases the opportunity of continuing the operation of the internal combustion engine without an auto stop, thus increasing the opportunity of the learning under fuel injection from the port fuel injection valve. The 'learning under fuel injection from the port fuel injection valve' includes learning under fuel injection from only the port fuel injection valve and learning under fuel injection from both the in-cylinder fuel injection valve and the port fuel injection valve.

In one preferable application of the vehicle according to the above aspect of the invention, the learning execution module performs the learning under fuel injection control of activating fuel injection from only the port fuel injection valve and inactivating fuel injection from the in-cylinder fuel injection valve. Setting the second temperature higher than the first temperature to the auto stop-permitting water temperature on incompletion of the learning under fuel injection control of activating fuel injection only from the port fuel injection valve desirably increases the opportunity of the learning under fuel injection control of activating fuel injection from only the port fuel injection valve.

In another preferable application of the vehicle according to the above aspect of the invention, the learning execution module performs learning with regard to an air-fuel ratio as the learning under fuel injection from the port fuel injection valve. This arrangement desirably increases the opportunity of the learning with regard to the air-fuel ratio.

In one preferable embodiment of the invention, the vehicle further has an engine controller configured to control the internal combustion engine to have fuel injection from only the port fuel injection valve with stop of fuel injection from the in-cylinder fuel injection valve at the measured temperature of cooling water that is not higher than a preset reference temperature. The auto stop-permitting water temperature setting module sets the second temperature to be higher than the preset reference temperature. The internal combustion engine is thus not automatically stopped under the fuel injection control of activating fuel injection from only the port fuel injection valve and inactivating fuel injection from the in-cylinder fuel injection valve. This arrangement desirably increases the opportunity of the learning under fuel injection control of activating fuel injection from only the port fuel injection valve.

According to another aspect, the present invention is directed to a control method of an internal combustion engine system including an internal combustion engine equipped with a port fuel injection valve arranged to inject a fuel into an intake port and with an in-cylinder fuel injection valve arranged to directly inject the fuel into each cylinder. The control method including: on completion of learning under fuel injection from the port fuel injection valve in a specified operation state of the internal combustion engine, setting a first temperature to an auto stop-permitting water temperature that allows an auto stop of the internal combustion engine, and on incompletion of the learning, setting a second temperature that is higher than the first temperature to the auto stop-permitting water temperature; and automatically stopping operation of the internal combustion engine upon satisfaction of preset auto stop conditions including a condition that temperature of cooling water in the internal combustion engine is not lower than the set auto stop-permitting water temperature and automatically restarting the operation of the internal combustion engine upon satisfaction of preset auto restart conditions in an auto stop state of the internal combustion engine.

In the control method according to this aspect of the invention, on completion of the learning under fuel injection from the port fuel injection valve performed in the specified operation state of the internal combustion engine, the first temperature is set to the auto stop-permitting water temperature that allows an auto stop of the internal combustion engine. On incompletion of the learning, on the other hand, the second temperature that is higher than the first temperature is set to the auto stop-permitting water temperature. The operation of the internal combustion engine is automatically stopped upon satisfaction of the preset auto stop conditions including the condition that the temperature of cooling water in the internal combustion engine is not lower than the auto stop-permitting water temperature. The operation of the internal combustion engine is automatically restarted upon satisfaction of the preset auto restart conditions in the auto stop state of the internal combustion engine. Setting the second temperature higher than the first temperature to the auto stop-permitting water temperature on incompletion of the learning under fuel injection from the port fuel injection valve in the specified operation state of the internal combustion engine desirably increases the opportunity of continuing the operation of the internal combustion engine without an auto stop, thus increasing the opportunity of the learning under fuel injection from the port fuel injection valve. The 'learning under fuel injection from the port fuel injection valve' includes learning under fuel injection from only the port fuel injection valve and learning under fuel injection from both the in-cylinder fuel injection valve and the port fuel injection valve.

BEST MODES OF CARRYING OUT THE INVENTION

Figure 1:
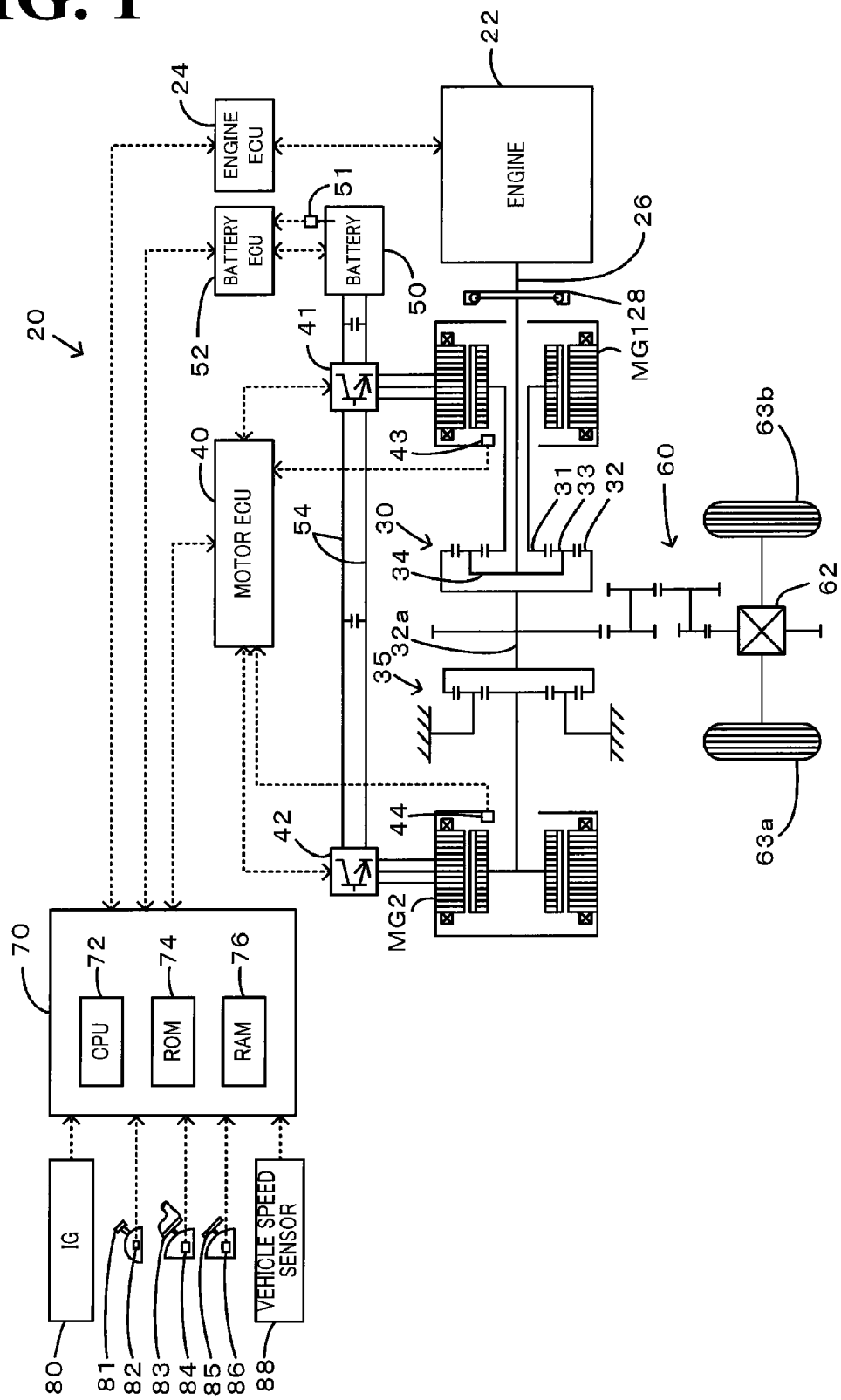
FIG. 1 schematically illustrates the configuration of a hybrid vehicle 20 of one embodiment of the invention.

One mode of carrying out the invention is described below as a preferred embodiment. FIG. 1 schematically illustrates the configuration of a hybrid vehicle 20 equipped with an internal combustion engine system in one embodiment of the invention. As illustrated, the hybrid vehicle 20 of the embodiment includes the engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a reduction gear 35 attached to a ring gear shaft 32a or a driveshaft linked with the power distribution integration mechanism 30, a motor MG2 connected to the reduction gear 35, and a hybrid electronic control unit 70 configured to control the whole internal combustion engine system of the hybrid vehicle 20.

Figure 2:
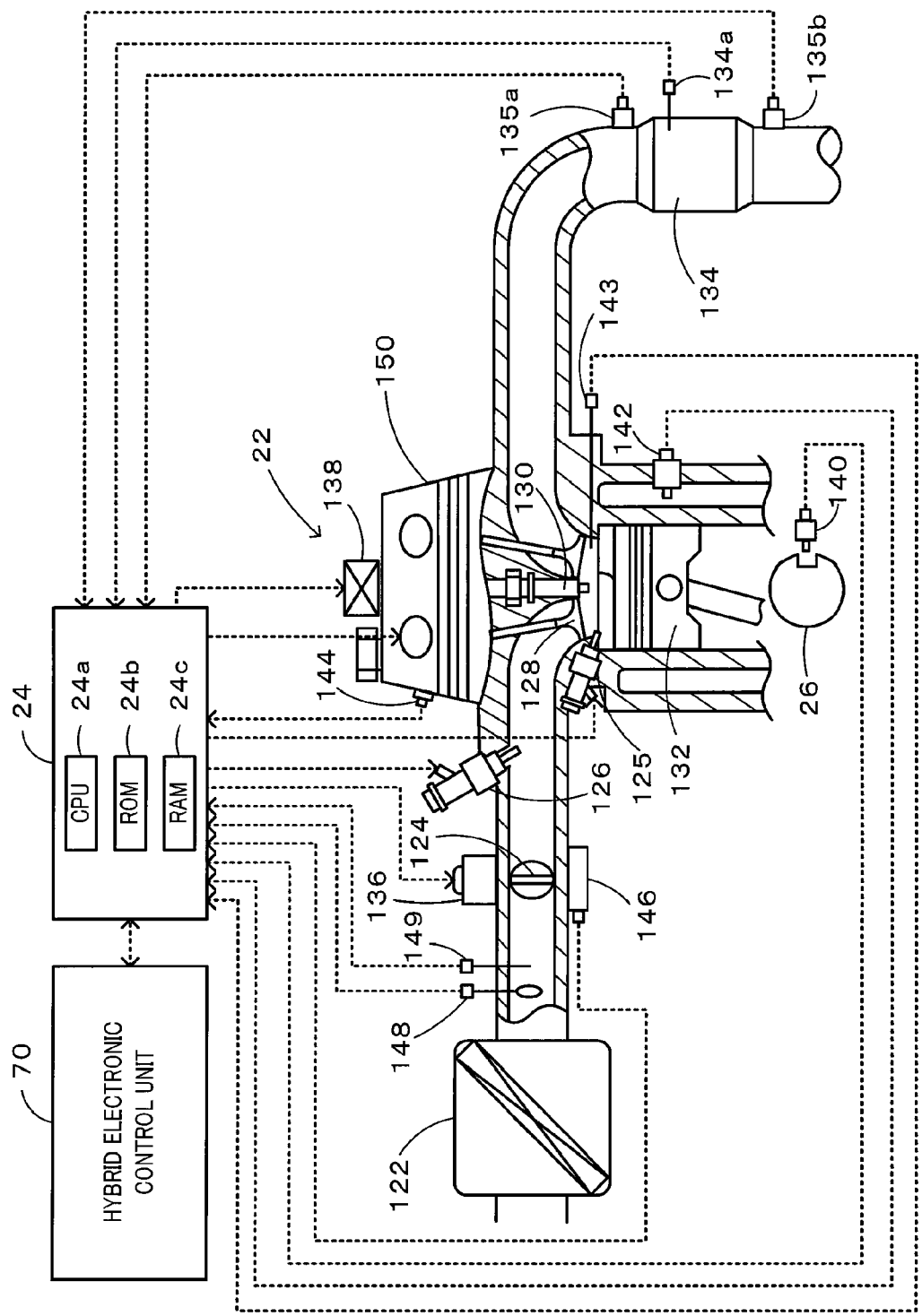
FIG. 2 schematically illustrates the configuration of an engine 22.

As shown in FIG. 2, the engine 22 is constructed as an internal combustion engine having an in-cylinder fuel injection valve 125 arranged to directly inject a hydrocarbon fuel, such as gasoline or light oil, into each cylinder and a port fuel injection valve 126 arranged to inject the fuel into an intake port. The engine 22 equipped with the two different types of the fuel injection valves 125 and 126 is driven in one of three different drive modes, a port injection drive mode, an in-cylinder injection drive mode, and a combined injection drive mode. In the port injection drive mode, the air cleaned by an air cleaner 122 and taken in via a throttle valve 124 is mixed with the atomized fuel injected from the port fuel injection valve 126 to the air-fuel mixture. The air-fuel mixture is introduced into a combustion chamber by means of an intake valve 128. The introduced air-fuel mixture is ignited with spark made by a spark plug 130 to be explosively combusted. The reciprocating motions of a piston 132 pressed down by the combustion energy are converted into rotational motions of the crankshaft 26. In the in-cylinder injection drive mode, the fuel is injected from the in-cylinder fuel injection valve 125 in the middle of the intake stroke or at the compression stroke after the intake and introduction of the air into the combustion chamber. The air-fuel mixture is ignited with spark made by the spark plug 130 to be explosively combusted and generate the energy for the rotational motions of the crankshaft 26. In the combined injection drive mode, while the fuel is injected from the port fuel injection valve 126 to be mixed with the air and is introduced into the combustion chamber, the fuel is injected from the in-cylinder fuel injection valve 125 in the middle of the intake stroke or at the compression stroke to generate the energy for the rotational motions of the crankshaft 26. The drive mode is changed over according to current operating conditions of the engine 22 and target operating conditions required for the engine 22. The engine 22 is controlled to be driven in the port injection drive mode, when the temperature of cooling water for the engine 22 or a cooling water temperature Tw measured by a water temperature sensor 142 is not higher than a port injection temperature Twp (for example, 65° C.) as an upper limit temperature. The cooling water temperature Tw of not higher than the port injection temperature Twp causes insufficient vaporization of the fuel injected from the in-cylinder fuel injection valve 125. The exhaust from the engine 22 goes through a catalytic converter (three-way catalyst) 134 designed to convert toxic components included in the exhaust, that is, carbon monoxide (CO), hydrocarbons (HC), and nitrogen oxides (NOx), into harmless components and is discharged to the outside air.

The engine 22 is under control of an engine electronic control unit (hereafter referred to as engine ECU) 24. The engine ECU 24 is constructed as a microprocessor including a CPU 24a, a ROM 24b configured to store processing programs, a RAM 24c configured to temporarily store data, input and output ports (not shown), and a communication port (not shown). The engine ECU 24 receives, via its input port, signals from various sensors designed to measure and detect the operating conditions of the engine 22. The signals input into the engine ECU 24 include a crank position from a crank position sensor 140 detected as the rotational position of the crankshaft 26, the cooling water temperature Tw from the water temperature sensor 142 measured as the temperature of cooling water in the engine 22, an in-cylinder pressure Pin from a pressure sensor 143 located in the combustion chamber, cam positions from a cam position sensor 144 detected as the rotational positions of camshafts driven to open and close the intake valve 128 and an exhaust valve for gas intake and exhaust into and from the combustion chamber, a throttle position from a throttle valve position sensor 146 detected as the position of the throttle valve 124, an air flow meter signal AF from an air flow meter 148 located in an air intake conduit, an intake air temperature from a temperature sensor 149 located in the air intake conduit, an air-fuel ratio AF from an air fuel ratio sensor 135a, and an oxygen signal from an oxygen sensor 135b. The engine ECU 24 outputs, via its output port, diverse control signals and driving signals to drive and control the engine 22. The signals output from the engine ECU 24 include driving signals to the in-cylinder fuel injection valve 125 and the port fuel injection valve 126, driving signals to a throttle valve motor 136 driven to regulate the position of the throttle valve 124, control signals to an ignition coil 138 integrated with an igniter, and control signals to a variable valve timing mechanism 150 to vary the open and close timings of the intake valve 128. The engine ECU 24 establishes communication with the hybrid electronic control unit 70 to drive and control the engine 22 in response to control signals received from the hybrid electronic control unit 70 and to output data regarding the operating conditions of the engine 22 to the hybrid electronic control unit 70 according to the requirements.

The engine ECU 24 also controls the engine 22 to change over its drive mode according to the operating conditions of the engine, for example, a rotation speed Ne and a load factor of the engine 22, among the port injection drive mode, the in-cylinder injection drive mode, and the combined injection drive mode. The engine ECU 24 further performs learning on the air-fuel ratio used for controlling the fuel injection from the in-cylinder fuel injection valve 125 and the port fuel injection valve 126 (hereafter referred to as the air-fuel ratio learning). The air-fuel ratio learning is performed in each of the port injection drive mode, the in-cylinder injection drive mode, and the combined injection drive mode in this embodiment. The air-fuel ratio learning compares an air-fuel ratio computed from the observed value with a target air-fuel ratio in the stable operation state of the engine 22, and sets an average difference between the computed air-fuel ratio and the target air-fuel ratio to a learning value. The stable operation state of the engine 22 is, for example, the state of controlling an amount of fuel injection from only one of the in-cylinder fuel injection valve 125 and the port fuel injection valve 126 to a substantially constant level or controlling amounts of fuel injection from both the in-cylinder fuel injection valve 125 and the port fuel injection valve 126 to substantially constant levels at a substantially fixed opening of the throttle valve 124. The air-fuel learning is concluded when a population parameter in computation of the average value reaches a preset value. In each of the port injection drive mode, the in-cylinder injection drive mode, and the combined injection drive mode, multiple different areas, for example, an idle drive area, a low intake air amount area, a low-to-middle intake air amount area, a middle-to-high intake air amount area, and a high intake air amount area, may be set as learning areas. In this application, the air-fuel ratio learning is performed in each of the multiple different learning areas. The air-fuel ratio learning is not characteristic of the present invention and is not described in detail.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment constructed as described above sets a torque demand, which is to be output to the ring gear shaft 32a or the driveshaft, based on the vehicle speed V and the accelerator opening Acc corresponding to the driver's depression amount of the accelerator pedal 83, and controls the operations of the engine 22 and the motors MG1 and MG2 to ensure output of a power demand corresponding to the preset torque demand to the ring gear shaft 32a. There are several drive control modes of the engine 22 and the motors MG1 and MG2. In a torque conversion drive mode, while the engine 22 is driven and controlled to ensure output of a power equivalent to the power demand, the motors MG1 and MG2 are driven and controlled to enable all the output power of the engine 22 to be subjected to torque conversion by the power distribution integration mechanism 30 and the motors MG1 and MG2 and to be output to the ring gear shaft 32a. In a charge-discharge drive mode, the engine 22 is driven and controlled to ensure output of a power corresponding to the sum of the power demand and an electric power required for charging the battery 50 or an electric power to be discharged from the battery 50. The motors MG1 and MG2 are driven and controlled to enable all or part of the output power of the engine 22 with charge or discharge of the battery 50 to be subjected to torque conversion by the power distribution integration mechanism 30 and the motors MG1 and MG2 and to ensure output of a power equivalent to the power demand to the ring gear shaft 32a. In a motor drive mode, the motor MG2 is driven and controlled to ensure output of a power equivalent to the power demand to the ring gear shaft 32a, while the engine 22 stops its operation. In the hybrid vehicle 20 of the embodiment, the engine 22 automatically stops upon satisfaction of auto stop conditions based on the accelerator opening Acc, the vehicle speed V, and the state of charge (SOC) of the battery 50. The hybrid vehicle 20 is then driven in the motor drive mode. The automatically stopped engine 22 automatically restarts upon satisfaction of auto restart conditions based on the accelerator opening Acc, the vehicle speed V, and the state of charge (SOC) of the battery 50. The hybrid vehicle 20 is then driven in the torque conversion drive mode or in the charge-discharge drive mode.

The following describes the operations of the hybrid vehicle 20 of the embodiment having the configuration discussed above, especially series of processing to automatically stop and automatically restart the operations of the engine 22 and to set an auto stop-permitting water temperature Tws used as one of the auto stop conditions of the engine 22. The explanation is given in the sequence of the processing to automatically stop and automatically restart the engine 22 and the processing to set the auto stop-permitting water temperature Tws as one of the auto stop conditions.

Figure 3:
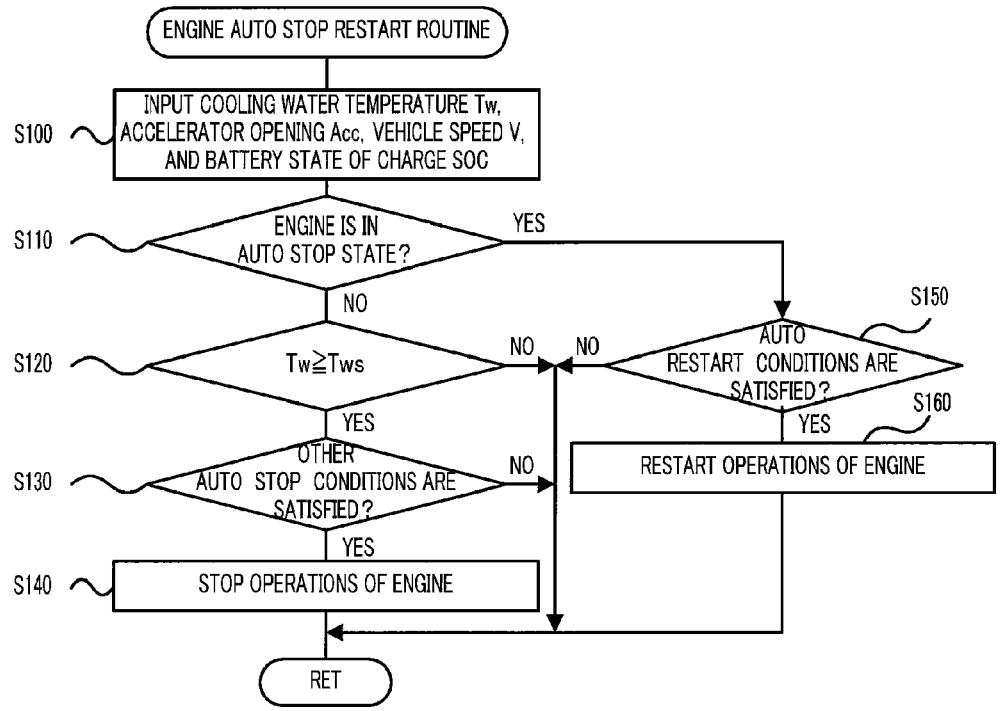
FIG. 3 is a flowchart showing an engine auto stop restart routine executed by an engine ECU 24.

FIG. 3 is a flowchart showing an engine auto stop restart routine executed by the engine ECU 24. This routine is repeatedly performed at preset time intervals, for example, at every several msec. In the engine auto stop restart routine, the CPU 24a of the ECU 24 first inputs various data required for execution of this routine, for example, the temperature of cooling water in the engine 22 or the cooling water temperature Tw from the water temperature sensor 142, the accelerator opening Acc, the vehicle speed V, and the state of charge SOC of the battery 50 (step S100). The accelerator opening Acc and the vehicle speed V are detected by the accelerator pedal position sensor 84 and the vehicle speed sensor 88 and are input from the hybrid electronic control unit 70. The state of charge SOC of the battery 50 is computed by the battery ECU 52 and is input via the hybrid electronic control unit 70 by communication.

The CPU 24a subsequently identifies whether the engine 22 is in an auto stop state (step S110). Such identification is based on the setting of a flag, which is set to 1 in the auto stop state of the engine 22. Upon identification that the engine 22 is not in the auto stop state, the CPU 24a successively determines whether the cooling water temperature Tw is not lower than the auto stop-permitting water temperature Tws as a threshold temperature of cooling water to give permission for an auto stop of the engine 22 (step S120) and whether the other auto stop conditions based on the accelerator opening Acc, the vehicle speed V, and the state of charge SOC of the battery 50 other than the cooling water temperature Tw are satisfied (step S130). The procedure of setting the auto stop-permitting water temperature Tws will be described later in detail.

When it is determined that the cooling water temperature Tw is not lower than the auto stop-permitting water temperature Tws and that the other auto stop conditions are satisfied (steps S120 and S130), the CPU 24a executes a series of processing to stop the ignition control and the fuel injection control in the engine 22 to stop the operations of the engine 22 (step S140), prior to terminating the engine auto stop restart routine. When the cooling water temperature Tw is lower than the auto stop-permitting water temperature Tws (step S120) or when the other auto stop conditions are not satisfied (step S130), the engine auto stop restart routine is terminated without stopping the operations of the engine 22. The engine 22 is thus automatically stopped when the cooling water temperature Tw is not lower than the auto stop-permitting water temperature Tws and the other auto stop conditions are satisfied.

Upon identification that the engine 22 is in the auto stop state, on the other hand, the CPU 24a determines whether the auto restart conditions based on the accelerator opening Acc, the vehicle speed V, and the state of charge SOC of the battery 50 are satisfied (step S150). Upon satisfaction of the auto restart conditions, the CPU 24a executes a series of processing to start the ignition control and the fuel injection control in the engine 22 to restart the operations of the engine 22 (step S160), prior to terminating the engine auto stop restart routine. Upon failure of the auto restart conditions, the engine auto stop restart routine is terminated without restarting the operations of the engine 22. The engine 22 is thus automatically restarted when the auto restart conditions are satisfied in the auto stop state of the engine 22.

Figure 4:
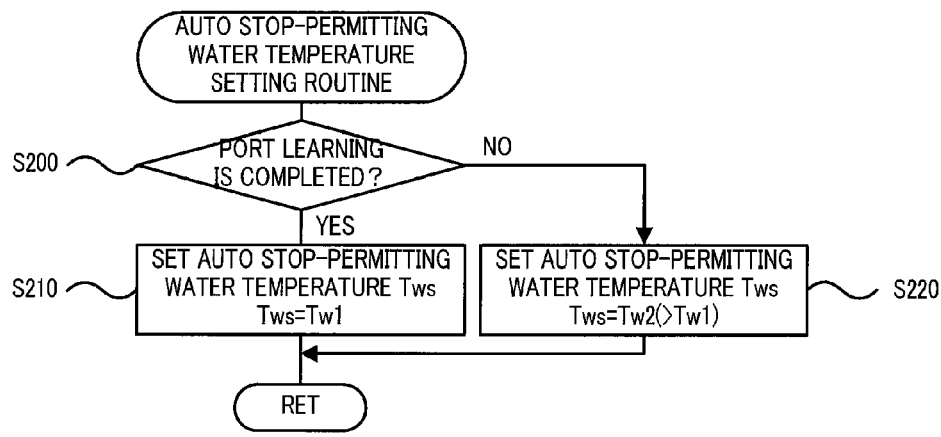
FIG. 4 is a flowchart showing an auto stop-permitting water temperature setting routine executed by the engine ECU 24.

The procedure of setting the auto stop-permitting water temperature Tws is explained below. FIG. 4 is a flowchart showing an auto stop-permitting water temperature setting routine executed by the engine ECU 24. This routine is repeatedly performed at preset time intervals, for example, at every several msec.

In the auto stop-permitting water temperature setting routine, the CPU 24a of the engine ECU 24 determines completion or incompletion of the air-fuel ratio learning under the operation control of the engine 22 in the port injection drive mode, that is, under fuel injection control of activating the fuel injection only from the port fuel injection valve 126 and inactivating the fuel injection from the in-cylinder fuel injection valve 125 (step S200). Such air-fuel ratio learning is hereafter referred to as the port learning. On completion of the port learning, the CPU 24a sets the auto stop-permitting water temperature Tws to a preset temperature Tw1 (for example, 40° C.) (step S210), prior to terminating this auto stop-permitting water temperature setting routine. The preset temperature Tw1 represents a lower limit temperature of cooling water that ensures the stable operation of the engine 22. On completion of the port learning, the engine 22 is automatically stopped upon satisfaction of the other auto stop conditions in combination with the cooling water temperature Tw at or over the preset temperature Tw1.

On incompletion of the port learning, on the other hand, the CPU 24a sets the auto stop-permitting water temperature Tws to a preset temperature Tw2 (for example, 60° C.) (step S220), prior to terminating this auto stop-permitting water temperature setting routine. The preset temperature Tw2 is higher than the preset temperature Tw1 and is higher than a port injection temperature Twp as an upper limit temperature that enables the engine 22 to be driven in the port injection drive mode. On incompletion of the port learning, the engine 22 is automatically stopped upon satisfaction of the other auto stop conditions in combination with the cooling water temperature Tw at or over the preset temperature Tw2. Setting the auto stop-permitting water temperature Tws to be higher than the preset temperature Tw1 increases the opportunity of continuing the operation of the engine 22 without an auto stop of the engine 22. Setting the auto stop-permitting water temperature Tws to be higher than the port injection temperature Twp enables the engine 22 to continue the operation without an auto stop at the temperature of not higher than the port injection temperature Twp. This arrangement increases the opportunity of the port learning, compared with the simple auto stop of the engine 22.

As described above, on incompletion of the port learning, the hybrid vehicle 20 of the embodiment sets the auto stop-permitting water temperature Tw to be higher than the water temperature set on completion of the port learning and to be higher than the port injection temperature Twp as the upper limit temperature that enables the engine 22 to be driven in the port injection drive mode. This arrangement increases the opportunity of the port learning.

The primary elements in the embodiment are mapped to the primary constituents in the claims of the invention as described below. The engine 22 equipped with the port fuel injection valve 126 arranged to inject the hydrocarbon fuel, such as gasoline or light oil, into the intake port and the in-cylinder fuel injection valve 125 arranged to directly inject the fuel into each cylinder in the embodiment is equivalent to the 'internal combustion engine' in the claims of the invention. The engine ECU 24 configured to perform the air-fuel ratio learning under the fuel injection from the port fuel injection valve 126 in the stable operation state of the engine 22 in the embodiment is equivalent to the 'learning execution module' in the claims of the invention. The engine ECU 24 configured to execute the processing of steps S200 and S210 or the processing of steps S200 and S220 in the embodiment is equivalent to the 'auto stop-permitting water temperature setting module' in the claims of the invention. The processing of steps S200 and S210 sets the auto stop-permitting water temperature Tws used for permitting an auto stop of the engine 22 to the preset temperature Tw1 on completion of the port learning. The processing of steps S200 and S220 sets the auto stop-permitting water temperature Tws to the preset temperature Tw2 that is higher than the preset temperature Tw1 on incompletion of the port learning. The water temperature sensor 142 arranged to measure the temperature of cooling water in the engine 22 in the embodiment is equivalent to the 'cooling water temperature detection unit' in the claims of the invention. The engine ECU 24 configured to execute the processing of steps S120 to S140 or the processing of steps S150 and S160 in the embodiment is equivalent to the 'auto stop restart controller' in the claims of the invention. The processing of steps S120 to S140 automatically stops the operations of the engine 22 upon satisfaction of the other auto stop conditions in combination with the cooling water temperature Tw at or over the auto stop-permitting water temperature Tws. The processing of steps S150 and S160 automatically restarts the operations of the engine 22 upon satisfaction of the auto restart conditions in the auto stop state of the engine 22. The engine ECU 24 configured to control the engine 22 to have fuel injection only from the port fuel injection valve 126 with stop of fuel injection from the in-cylinder fuel injection valve 125 at the cooling water temperature Tw of not higher than the port injection temperature Twp in the embodiment is equivalent to the 'engine controller' in the claims of the invention. The above mapping of the primary elements in the embodiment to the primary constituents in the claims of the invention is not restrictive in any sense but is only illustrative for concretely describing the modes of carrying out the invention. Namely the embodiment is to be considered in all aspects as illustrative and not restrictive. The scope and spirit of the present invention are indicated by the appended claims, rather than by the foregoing description.

In the hybrid vehicle 20 of the embodiment, the preset temperature Tw2 is higher than the port injection temperature Twp. This is, however, neither essential nor restrictive. The requirement is that the preset temperature Tw2 is to be higher than the preset temperature Tw1 to increase the opportunity of continuing the operation of the engine 22. The preset temperature Tw2 may thus be not higher than the port injection temperature Twp. The hybrid vehicle 20 of the embodiment performs the air-fuel ratio learning under the fuel injection control of the engine 22 driven in the port injection drive mode. One modification may perform the air-fuel ratio learning under the operation control of the engine 22 in the combined injection drive mode, that is, under fuel injection control of activating the fuel injection from both the in-cylinder fuel injection valve 125 and the port fuel injection valve 126. In this modification, it is preferable to set the auto stop-permitting water temperature Tw to be higher than an upper limit temperature that enables the engine 22 to be driven in the combined injection drive mode.

The hybrid vehicle 20 of the embodiment automatically stops the operations of the engine 22 upon satisfaction of the other auto stop conditions in combination with the cooling water temperature Tw at or over the auto stop-permitting water temperature Tws. One modification may automatically stop the operations of the engine 22 upon satisfaction of the other auto stop conditions or under the control of the cooling water temperature Tw to or over the auto stop-permitting water temperature Tws.

The hybrid vehicle 20 of the embodiment performs the air-fuel ratio learning under the fuel injection control of activating the fuel injection only from the port fuel injection valve 126 and inactivating the fuel injection from the in-cylinder fuel injection valve 125. The learning is, however, not restricted to the air-fuel ratio learning but may be learning with regard to the fuel injection from the port fuel injection valve 126, for example, learning with regard to the opening of the throttle valve 124 in the state of idling the engine 22 or learning with regard to the ignition timing of the spark plug 130.

Figure 5:
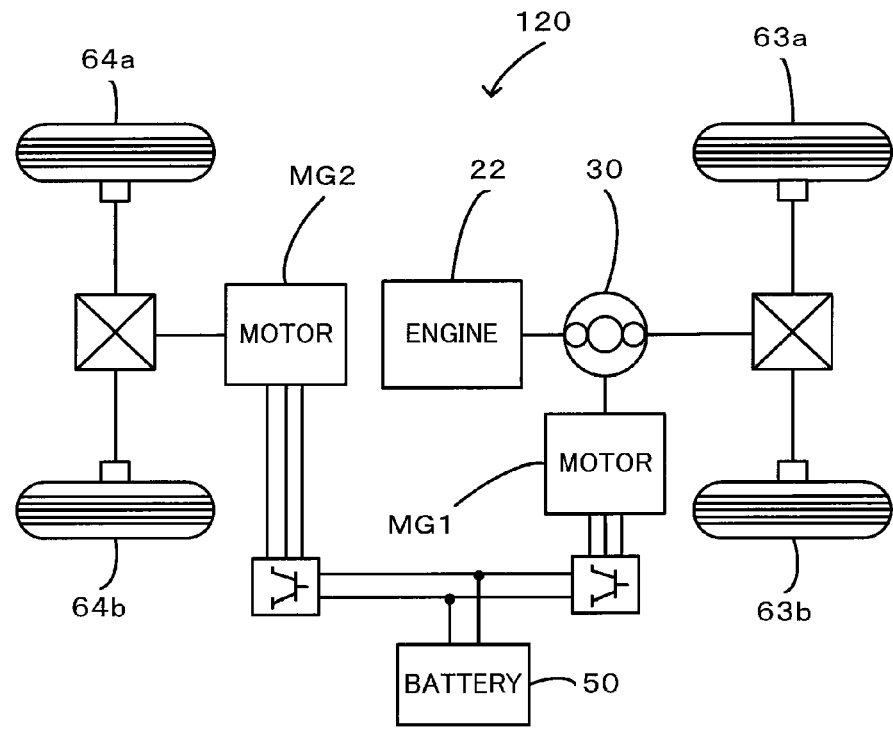
FIG. 5 schematically illustrates the configuration of a hybrid vehicle 120 of one modified structure.

In the hybrid vehicle 20 of the embodiment, the power of the motor MG2 is subjected to speed reduction by the reduction gear 35 and is output to the ring gear shaft 32a. The technique of the invention is, however, not restricted to the hybrid vehicles of this configuration but is also applicable to a hybrid vehicle 120 of a modified configuration shown in FIG. 5. In the hybrid vehicle 120 of FIG. 5, the power of the motor MG2 is connected to another axle (an axle linked with wheels 64a and 64b) that is different from an axle connecting with the ring gear shaft 32a (an axle linked with the drive wheels 63a and 63b).

Figure 6:
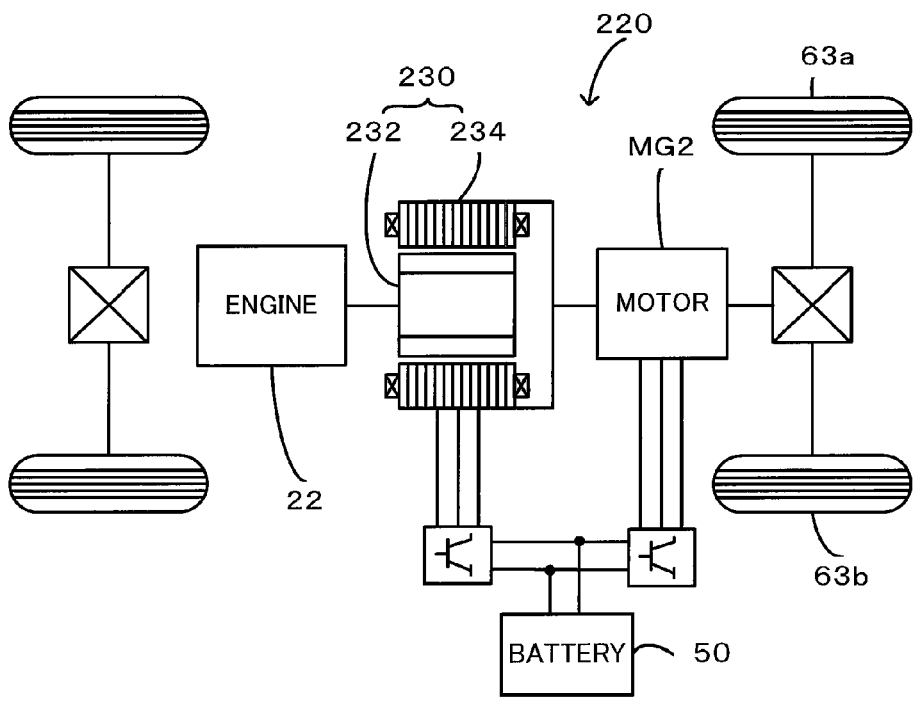
FIG. 6 schematically illustrates the configuration of a hybrid vehicle 220 of another modified structure.

In the hybrid vehicle 20 of the embodiment, the power of the engine 22 is output via the power distribution integration mechanism 30 to the ring gear shaft 32a or the driveshaft linked with the drive wheels 63a and 63b. The technique of the invention is, however, not restricted to the hybrid vehicles of this configuration but is also applicable to a hybrid vehicle 220 of another modified configuration shown in FIG. 6. The hybrid vehicle 220 of FIG. 6 is equipped with a pair-rotor motor 230. The pair-rotor motor 230 includes an inner rotor 232 connected to the crankshaft 26 of the engine 22 and an outer rotor 234 connected to a driveshaft for outputting power to drive wheels 63a and 63b. The pair-rotor motor 230 transmits part of the output power of the engine 22 to the driveshaft, while converting the residual engine output power into electric power.

The above embodiment describes the application of the internal combustion engine system of the invention to the hybrid vehicle 20 equipped with both the engine and the motor as the driving power source. The technique of the invention is applicable to a vehicle of any other configuration equipped with an engine and constructed to automatically stop the engine upon satisfaction of preset auto stop conditions and to automatically restart the automatically-stopped engine upon satisfaction of preset auto restart conditions. For example, the invention may be actualized by a vehicle equipped with an engine but no driving motor and constructed to perform idle stop control of auto stops and auto restarts of the engine. The technique of the invention is actualized by diversity of other applications that allow an auto stop and an auto restart of the engine, for example, an internal combustion engine system that is not mounted on a vehicle or a control method of the internal combustion engine system.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The technique of the present invention is preferably applied to the manufacturing industries of internal combustion engine systems or hybrid vehicles.

The invention claimed is:

1. A control method of an internal combustion engine system including an internal combustion engine equipped with a port fuel injection valve arranged to inject a fuel into an intake port and with an in-cylinder fuel injection valve arranged to directly inject the fuel into each cylinder, the control method comprising:

on completion of learning under fuel injection from the port fuel injection valve in a specified operation state of the internal combustion engine, setting a first temperature to an auto stop-permitting water temperature that allows an auto stop of the internal combustion engine, and on incompletion of the learning, setting a second temperature that is higher than the first temperature to the auto stop-permitting water temperature; and automatically stopping operation of the internal combustion engine upon satisfaction of preset auto stop conditions including a condition that temperature of cooling water in the internal combustion engine is not lower than the set auto stop-permitting water temperature and automatically restarting the operation of the internal combustion engine upon satisfaction of preset auto restart conditions in an auto stop state of the internal combustion engine.

2. An internal combustion engine system including an internal combustion engine equipped with a port fuel injection valve arranged to inject a fuel into an intake port and with an in-cylinder fuel injection valve arranged to directly inject the fuel into each cylinder, the internal combustion engine system comprising:

a learning execution module configured to perform learning under fuel injection from the port fuel injection valve in a specified operation state of the internal combustion engine;

an auto stop-permitting water temperature setting module configured to, on completion of the learning, set a first temperature to an auto stop-permitting water temperature that allows an auto stop of the internal combustion engine, and on incompletion of the learning, set a second temperature that is higher than the first temperature to the auto stop-permitting water temperature;

a cooling water temperature detection unit constructed to measure temperature of cooling water in the internal combustion engine; and an auto stop restart controller configured to automatically stop operation of the internal combustion engine upon satisfaction of preset auto stop conditions including a condition that the measured temperature of cooling water is not lower than the set auto stop-permitting water temperature and to automatically restart the operation of the internal combustion engine upon satisfaction of preset auto restart conditions in an auto stop state of the internal combustion engine.

3. The internal combustion engine system in accordance with claim 2, wherein the learning execution module performs the learning under fuel injection control of activating fuel injection from only the port fuel injection valve and inactivating fuel injection from the in-cylinder fuel injection valve.

4. The internal combustion engine system in accordance with claim 2, wherein the learning execution module performs learning with regard to an air-fuel ratio as the learning under fuel injection from the port fuel injection valve.

5. The internal combustion engine system in accordance with claim 2, the internal combustion engine system further comprising:

an engine controller configured to control the internal combustion engine to have fuel injection from only the port fuel injection valve with stop of fuel injection from the in-cylinder fuel injection valve at the measured temperature of cooling water that is not higher than a preset reference temperature, wherein the auto stop-permitting water temperature setting module sets the second temperature to be higher than the preset reference temperature.

6. A vehicle, comprising:

an internal combustion engine equipped with a port fuel injection valve arranged to inject a fuel into an intake port and with an in-cylinder fuel injection valve arranged to directly inject the fuel into each cylinder;

a rotation speed regulator connected with an output shaft of the internal combustion engine, connected with a driveshaft, which is linked to an axle of the vehicle, such as to allow rotation of the driveshaft independently of the output shaft, and configured to regulate a relative rotation speed of the output shaft to the driveshaft with input and output of electric power and input and output of driving force from and to the output shaft and the driveshaft;

a motor designed to input and output power from and to the driveshaft;

a learning execution module configured to perform learning under fuel injection from the port fuel injection valve in a specified operation state of the internal combustion engine;

an auto stop-permitting water temperature setting module configured to, on completion of the learning, set a first temperature to an auto stop-permitting water temperature that allows an auto stop of the internal combustion engine, and on incompletion of the learning, set a second temperature that is higher than the first temperature to the auto stop-permitting water temperature;

a cooling water temperature detection unit constructed to measure temperature of cooling water in the internal combustion engine; and an auto stop restart controller configured to automatically stop operation of the internal combustion engine upon satisfaction of preset auto stop conditions including a condition that the measured temperature of cooling water is not lower than the set auto stop-permitting water temperature and to automatically restart the operation of the internal combustion engine upon satisfaction of preset auto restart conditions in an auto stop state of the internal combustion engine.

7. The vehicle in accordance with claim 6, wherein the learning execution module performs the learning under fuel injection control of activating fuel injection from only the port fuel injection valve and inactivating fuel injection from the in-cylinder fuel injection valve.

8. The vehicle in accordance with claim 6, wherein the learning execution module performs learning with regard to an air-fuel ratio as the learning under fuel injection from the port fuel injection valve.

9. The vehicle in accordance with claim 6, the vehicle further comprising:

an engine controller configured to control the internal combustion engine to have fuel injection from only the port fuel injection valve with stop of fuel injection from the in-cylinder fuel injection valve at the measured temperature of cooling water that is not higher than a preset reference temperature, wherein the auto stop-permitting water temperature setting module sets the second temperature to be higher than the preset reference temperature.

* * * * *